Feb. 11, 1958 — E. T. JESZKA — 2,822,709
BORING DEVICE
Filed Oct. 12, 1956 — 5 Sheets-Sheet 1

INVENTOR.
EDWARD T. JESZKA
BY Schroeder, Hofgren, Brady & Wegner
ATTORNEYS

Feb. 11, 1958  E. T. JESZKA  2,822,709
BORING DEVICE
Filed Oct. 12, 1956  5 Sheets-Sheet 2
FIG. 2
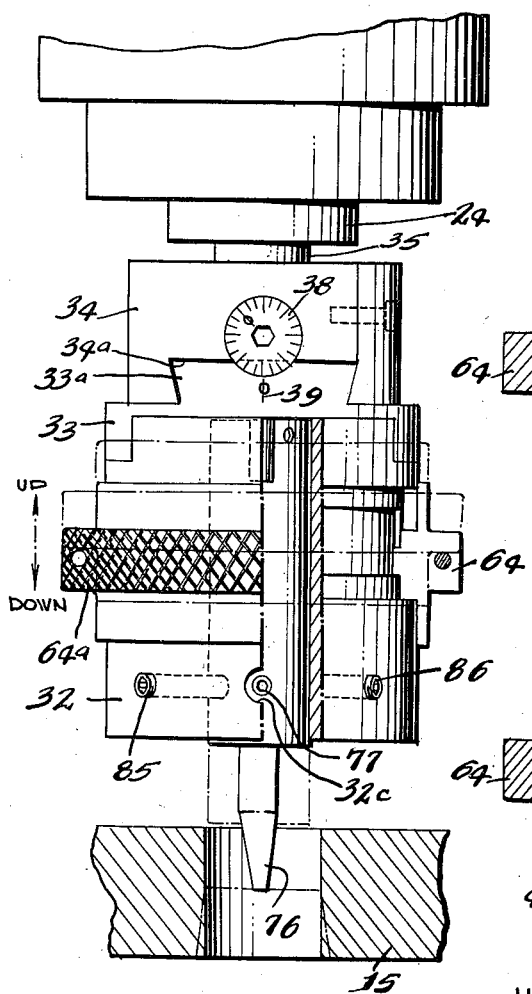
FIG. 3
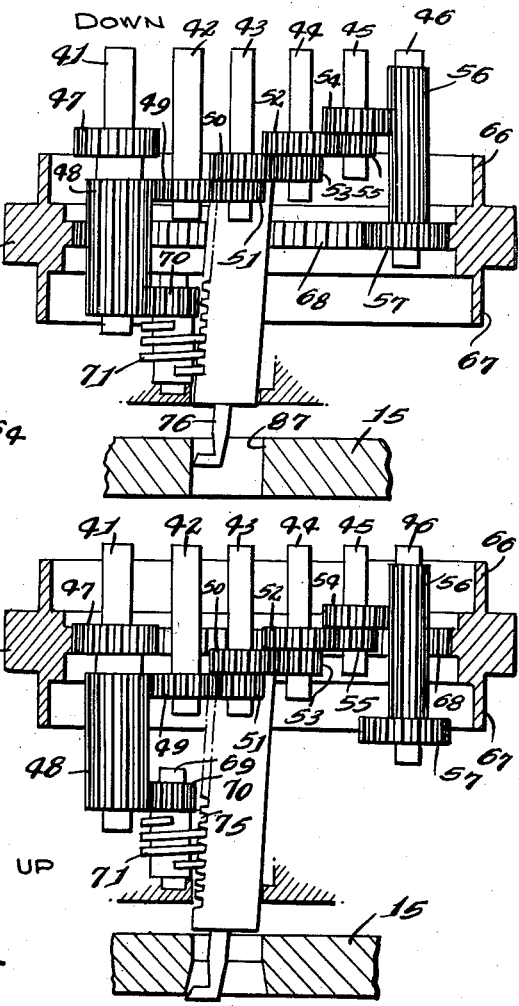
FIG. 4
INVENTOR.
EDWARD T. JESZKA
BY Schroeder, Hofgren,
  Brady & Wegner
ATTORNEYS Feb. 11, 1958 E. T. JESZKA 2,822,709
BORING DEVICE
Filed Oct. 12, 1956 5 Sheets-Sheet 3

INVENTOR.
EDWARD T. JESZKA
BY Schroeder, Hofgren,
Brody & Wegner
ATTORNEYS

Feb. 11, 1958     E. T. JESZKA     2,822,709
BORING DEVICE

Filed Oct. 12, 1956     5 Sheets-Sheet 4

INVENTOR.
EDWARD T. JESZKA
BY
ATTORNEYS

Feb. 11, 1958  E. T. JESZKA  2,822,709
BORING DEVICE
Filed Oct. 12, 1956  5 Sheets-Sheet 5
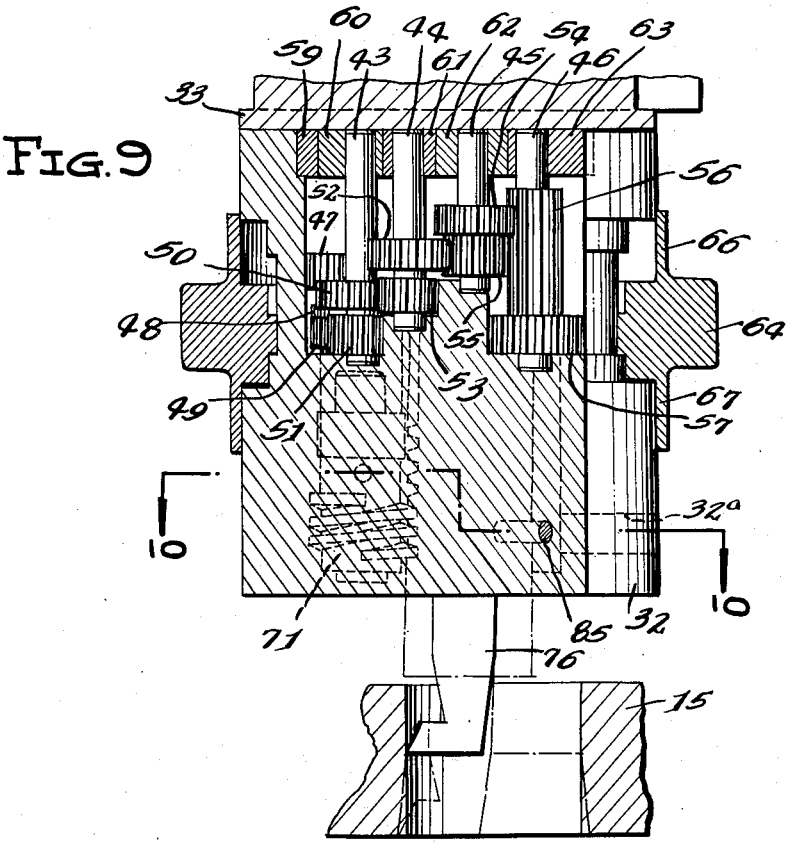
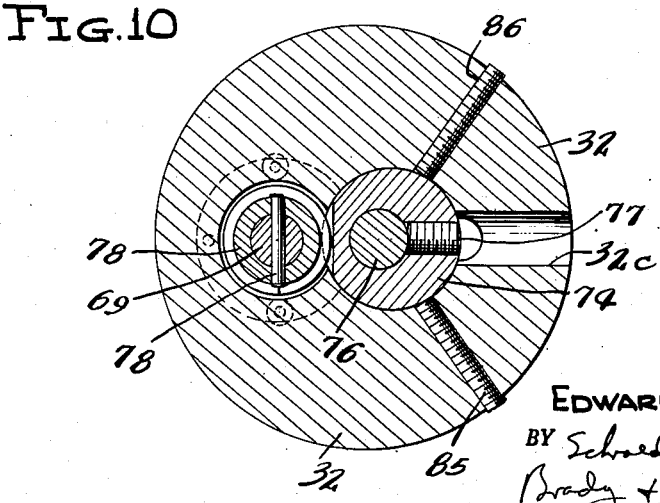
INVENTOR.
EDWARD T. JESZKA
BY Schroeder, Hofgren,
Brady + Wegner
ATTORNEYS

United States Patent Office 2,822,709
Patented Feb. 11, 1958

2,822,709

BORING DEVICE

Edward T. Jeszka, Chicago, Ill.

Application October 12, 1956, Serial No. 615,625

6 Claims. (Cl. 77—58)

This invention relates to a rotatable boring device for selectively boring either cylindrical or tapered holes as desired.

In die work it is often necessary to bore tapered holes in the work. This is usually necessary in order that scrap slugs of metal from the work can easily fall through the holes. At the present time, these tapered holes are now made customarily with taper ground reamers or with cutting tools on lathes. This type of cutting tapered holes is disadvantageous as it requires separate operations, and if the die is extremely large or bulky or the holes large or elongated taper ground reamers or tapering done on the lathe is not too successful.

The device of the present invention overcomes these disadvantages and can be used to bore either cylindrical or tapered holes and the taper boring can be accomplished immediately after the hole has been originally cylindrical-bored without moving the work to a separate device and without changing cutting tools.

One of the features of this invention is to provide an improved rotatable boring device for selectively boring cylindrical or tapered holes or holes that have one part cylindrical and another part tapered comprising a boring body rotatable about an axis of rotation, a cutting tool holder in said body movable relative to said body along a path that is at an acute angle with respect to the axis, apparatus movable relative to the body and the tool holder for thusly moving the tool holder, the moving apparatus being stationary relative to the body and the holder during cylindrical hole boring and movable relative to said body and the holder during tapered hole boring, and means for causing relative movement between the tool holder moving apparatus, body, and holder during tapered boring.

Other features and advantages of the invention will be apparent from the following description of one embodiment thereof as shown in the accompanying drawings. Of the drawings:

Figure 2 is an enlarged side elevational view partially broken away taken substantially along line 2—2 of Figure 1;

Figure 3 is a semi-diagrammatic view in vertical section illustrating the gear train of this embodiment with the control gear in down position in the device used for the boring of a bottom taper to a predrilled cylindrical hole;

Figure 4 is a view similar to Figure 3, but with the control gear in up position preparatory to retracting the cutting tool holder and cutting tool;

Figure 9 is a sectional view taken substantially along line 9—9 of Figure 7; and Figure 10 is a sectional view taken substantially along line 10—10 of Figure 9.

Figure 1:
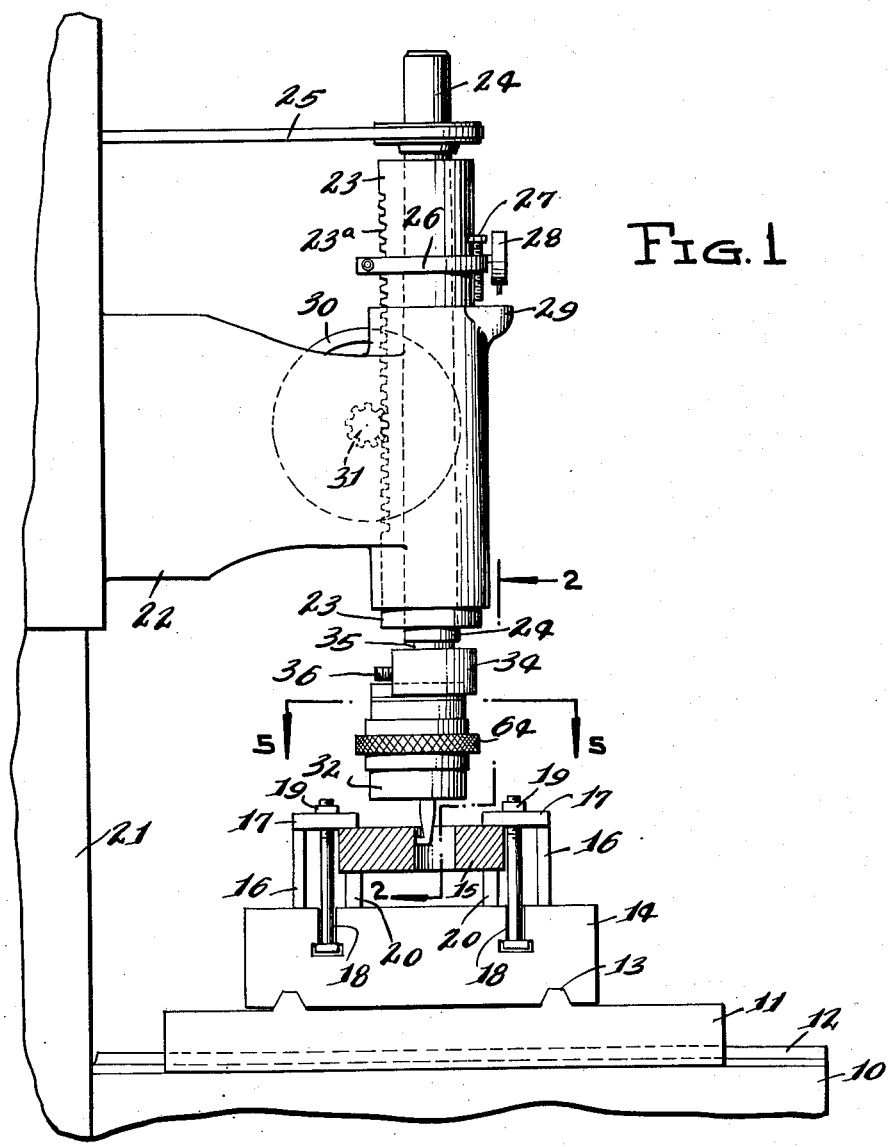
Figure 1 is a fragmentary side elevational view of a boring device embodying the invention.

The embodiment shown in the drawings is illustrated in conjunction with a typical work holder and drive for the device. Thus, in Figure 1 there is illustrated a typical jig boring machine including a support 10 having mounted thereon a cross feed saddle 11, with the support and saddle being provided with ways 12 and 13. Mounted on the parallel ways 13 is a table 14 on which the work 15 is clamped. The clamping means comprises clamp supports 16 supporting coplanar clamps 17 that are drawn tightly against the work by means of bolts 18 and nuts 19. The work itself is supported on work parallels 20.

At one side of the support 10 is a machine column 21 supporting a laterally extending head 22. The outer end of this head 22 movably supports a quill 23 provided with rack teeth 23a for vertical movement. There is also provided an internal spindle 24 that is rotatable by means of a belt 25 drive. Mounted adjacent to the upper end of the quill 23 is an adjustable ring 26 having attached thereto a stop screw 27 and an indicator 28 adapted to engage a pad 29. The quill 23 and its associated structure is movable in a vertical path by means of a hand wheel 30 having a gear 31 engaging the rack teeth 23a.

This apparatus is conventional for a jig boring machine and forms no part of the present invention.

The boring device of this invention is adapted to be mounted on the lower end of the spindle 24. The boring device comprises a body 32 of generally cylindrical shape provided with a cap 33. This cap is adapted to be held in a boring head 34 which has projecting from the top thereof a shank 35 adapted to be held in the bottom end of the spindle 24 in the customary manner.

The cap 33 is slidable for lateral adjustment in the bottom of the boring head 34 by means of a dove tail connection. Thus, the upper end of the cap 33 is provided with a vertical extension 33a adapted to dove tail in a sliding fit in a recess 34a in the bottom surface of the boring head 34.

In order to move the boring head laterally to adjusted positions, there is provided an adjusting micrometric screw 36 threadedly engaging the boring head 34 and having a collar 37 rotatably held in a cavity 34b at one side of the head 34 and engaging groove 33b in the top end of the cap 33. The end of the screw or bolt 36 within the cavity 34b is marked with a calibrated dial as indicated at 38 registering against a reference line indicated at 39 to show the relative amount of lateral movement on adjustment of the micrometric screw.

The cap 33 is attached to the top of the body 32 by means of a plurality of spaced screws 40 having heads flush with the top of the cap. Positioned within chambers in the body 32 are a series of parallel, normally vertical shafts 41, 42, 43, 44, 45, and 46. Mounted on the shaft 41 is a pair of vertically spaced gears 47 and 48, with the upper gear 47 being of larger diameter than the lower gear 48 and the gear 48 being considerably longer than the upper gear 47. Mounted on the shaft 42 is a gear 49 that meshes with the gear 48. Mounted on the shaft 43 is an upper gear 50 and a lower gear 51, with the upper gear being of larger diameter than the lower gear. The lower gear meshes with the gear 49.

Mounted on the shaft 44 is an upper gear 52 of somewhat larger diameter than a lower gear 53. The gear 53 meshes with the gear 50. Mounted on the shaft 45 is a relatively large upper gear 54 and a relatively small lower gear 55. The gear 55 meshes with the gear 52.

Mounted on the shaft 46 is an upper elongated gear 56 of relatively small diameter and a lower gear 57 of larger diameter. The gear 56 meshes with the gear 54. As can be seen, the gear 47 and meshing gears 48, 49, 50, 51, 52, 53, 54, 55, and 56 together with gear 57 constitute a gear train.

Figure 5:
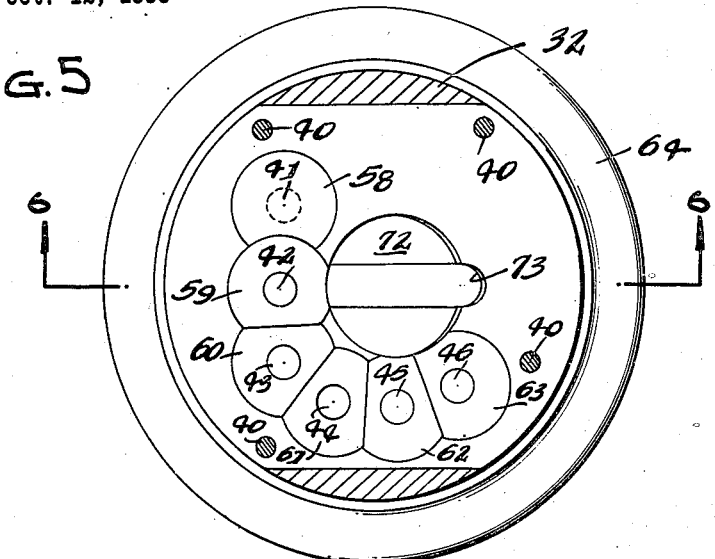
Figure 5 is an enlarged horizontal sectional view taken substantially along line 5—5 of Figure 1.
Figure 6:
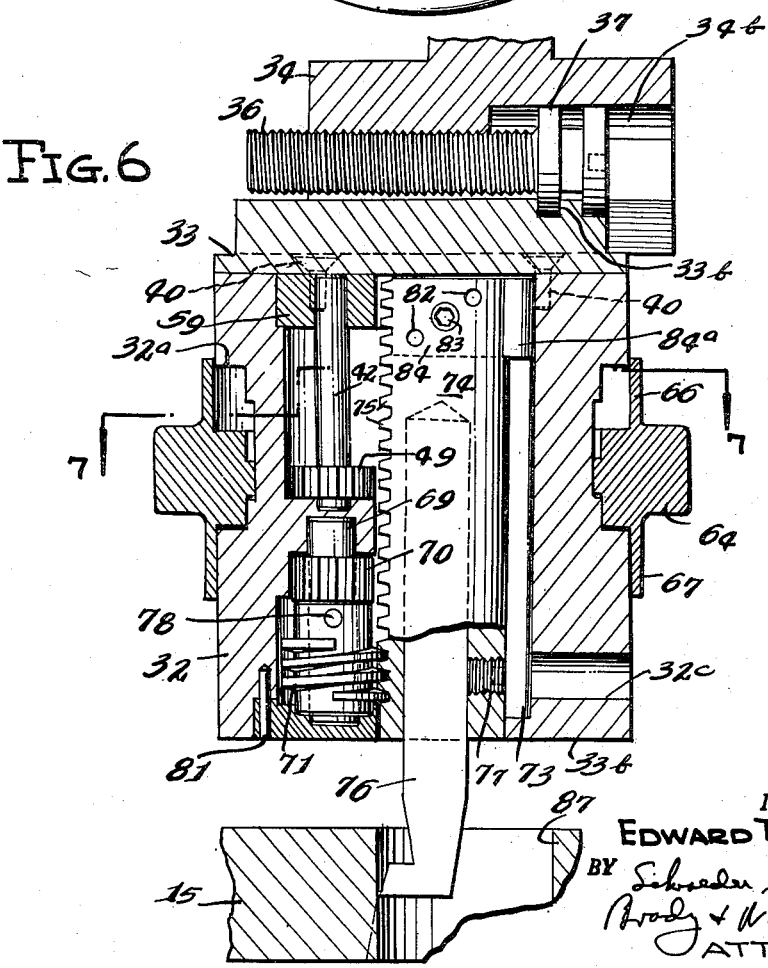
Figure 6 is a sectional view taken substantially along line 6—6 of Figure 5.
Figure 7:
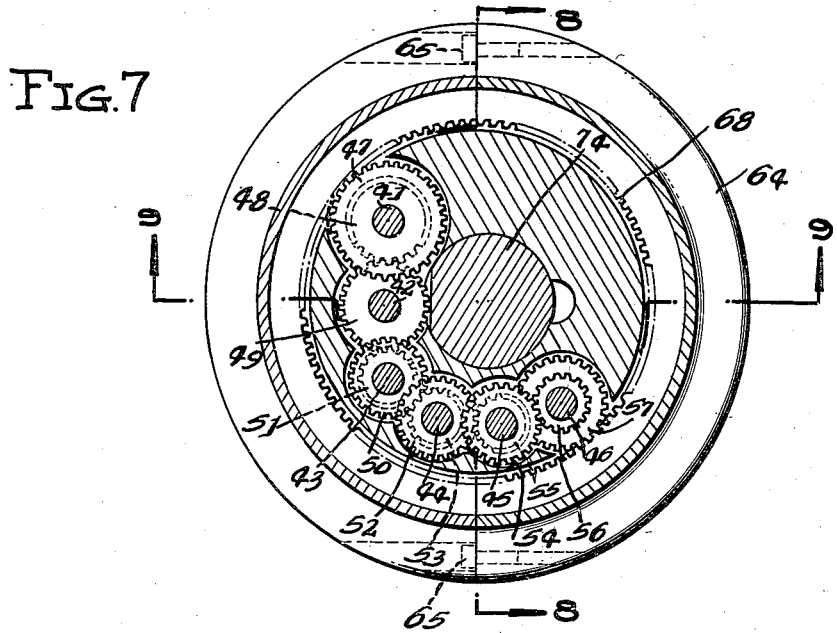
Figure 7 is a sectional view taken substantially along line 7—7 of Figure 6.
Figure 8:
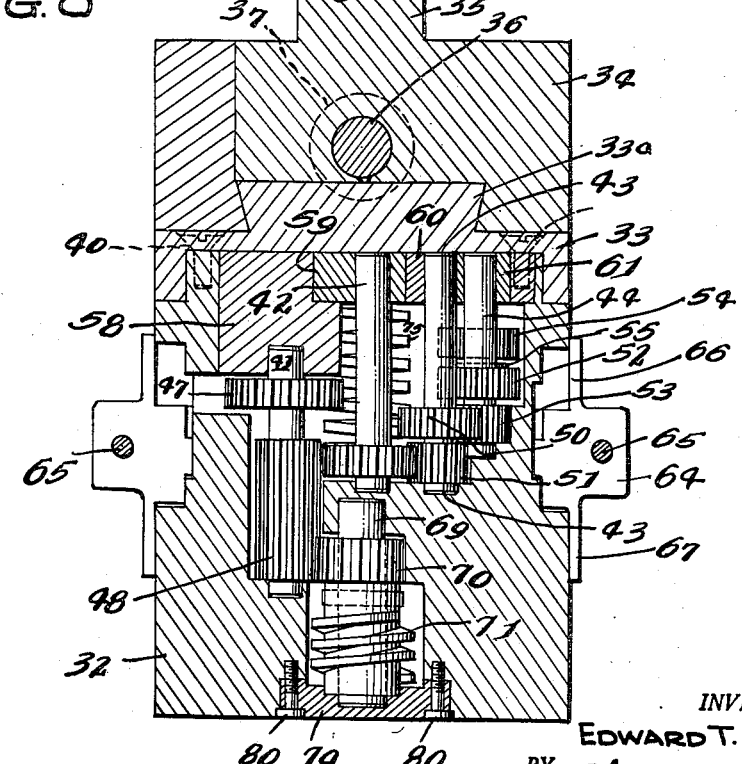
Figure 8 is a sectional view taken substantially along line 8—8 of Figure 7.

As mentioned previously, the shafts 41–46 and the attached gears are rotatably held in cavities formed within the body 32. The bottom ends of these shafts are journaled in seats provided in the body as illustrated in Figures 6, 8, and 9 while the upper ends of the shafts are held in bearing blocks 58, 59, 60, 61, 62, and 63. These bearing blocks may be of any suitable material, such as molded nylon, and, as can be seen in Figure 5, are noncircular so that they are held against rotation when the respective shafts rotate.

Mounted for vertical movement within an annular cavity 32a around the outer surface of the body 32 at an intermediate point between the top and the bottom thereof is a combined ring gear and control member 64. The outer surface of this annular member 64 is knurled as indicated at 65 so as to be capable of being tightly grasped by the hand of the operator. The ring gear and control member 64 are preferably divided into two substantially semicircular halves held together by a pair of bolts 65. The member 64 is provided with upper and lower vertically extending circular flanges 66 and 67 adapted to span the cavity 32a at all positions of the member 64 and to provide bearing surfaces in order that the member 64 will be vertically movable on the body 32.

The inner surface of the member 64 is provided with gear teeth 68 that are continuous in a circle and, thus, comprises the ring gear. In its lowermost position, as illustrated in Figure 3, this ring gear 68 engages the gear 57. In its upper position, as shown in Figure 4, the ring gear 68 engages the gear 47 on the other side of the device.

Located in the bottom portion of the body 32 is a vertical shaft 69 having attached thereto a gear 70 that meshes with the gear 48. The lower end of this shaft 69 is provided with a worm 71.

The lower end of the body 32 is also provided with an upwardly extending cavity 72 of circular cross-section having its lower end opening through the bottom surface 32b of the body. This essentially cylindrical cavity 72 has a central axis arranged at a small angle to the axis of the body 32 and thus to the vertical. This small angle is the undercut angle and may be any value desired, but in the embodiment illustrated is one-fourth of a degree. In the drawings, this angle is exaggerated for purposes of illustration.

At one side of the cavity 72 is an extension thereof 73 of generally semi-circular cross-section.

Mounted within the cavity 72 is a cutting tool holder in the form of a shaft 74. This shaft is of generally circular cross-section so as to fit snugly within the cavity 72, and one side of this shaft is provided with rack teeth 75 that are engaged by the worm 71. The lower end of the shaft 74 is hollow and is adapted to releasably retain an ordinary cutting tool 76. This cutting tool is releasably held within the shaft 74 by means of a set screw 77, which is accessible through an opening 32c in the body 32 when the shaft 74 is in fully retracted position, as illustrated at Figure 6 in the drawings.

The worm 71 is attached to the shaft 69 which passes therethrough by means of a lock pin 78 extending through the shaft and worm. The bottom end of the shaft 69 is journaled in a bottom cap 79, which is held in a recess in the bottom of the body 32 by means of socket screws 80. Also provided in the cap is a dowel pin 81 extending upwardly through the cap and into the body 32, as shown most clearly in Figure 6.

The upper end of the rack shaft 74 has attached thereto by means of dowel pins 82 and a socket screw 83 a guide key 84. This guide key has a lateral extension 84a shaped similarly to the cavity extension 73 and positioned therein for guiding the vertical travel of the shaft 74.

Although the rack shaft 74 is movable up and down relative to the body 32 by means of the worm 71 and rack teeth 75, it can be locked in any desired position by means of set screw 85. This set screw extends through the body 32 for engagement with the shaft. When in locked position, resistance to the force of tension on the shaft 74 during the cutting operation can be increased by means of a second set screw 86, which also extends through the body 32 with its inner end adapted to engage the shaft 74.

When the device is used to bore a cylindrical hole through the work 15, a customary cutting tool 76 is locked within the rack shaft 74 by means of the set screw 77. The shaft may then be locked in position by tightening the two set screws 85 and 86. Then rotation and downward movement of the spindle 24 in the customary manner bores a cylindrical hole. The diameter of this hole is determined by the setting of the micrometric screw 36 which adjusts the device laterally in the above described manner relative to the spindle. The degree of adjustment is illustrated by dial 38 operating against the reference line 39. During this cylindrical hole boring, the gears 47–57, 68, and 70 are stationary relative to each other and to the body 32 of the device although they, of course, turn with the device.

When it is desired to undercut a portion of this cylindrical hole, the set screws 85 and 86 are loosened and the device is withdrawn partially from the hole until the lower end of the cutting tool 76 is at a desired position in the hole. In the illustrated embodiment, this position is a little over one-third of the way from the top of the hole. The ring gear and control member 64, which in the meantime has been in any desired position in its up and down path, is then grasped by means of the knurled outer surface and moved to its lowermost position, as illustrated most clearly in Figures 1–3, 6, 8, and 9. The control member 64 is held by the operator in this position against rotation while the device is itself rotated by means of the spindle 24. As the ring gear 68 engages the gear 57, this causes rotation of the chain of gears 57, 56, 54, 55, 52, 53, 50, 51, 49, 48, and 70. This chain of gears acts as a speed reducer to rotate the worm gear 71 and force the rack shaft 74 carrying the cutting tool 76 slowly in a downward direction. Because of the slope of the path of travel of the shaft 74, this results in an undercut as indicated in the broken lines in Figures 2, 6, and 9. The gears 57 and 70 turn in the same direction. Thus, when the spindle 24 is rotated in its normal manner in a clockwise direction as viewed from the top at a slow rate of speed, the gears 57 and 70 rotate in a counterclockwise direction as viewed from the top. The worm 71 then forces the rack shaft 74 and attached cutting tool 76 downwardly and undercuts the lower portion of the cylindrical hole 87.

After the undercut portion has been completed as illustrated in Figure 4, the ring gear and control member 64 is grasped firmly and held against rotation and slowly moved upwardly through a neutral position where the ring gear 68 is above and out of engagement with gear 57. Upward movement is continued to the fullest possible extent, at which point ring gear 68 meshes with gear 47 on the opposite side of the body from the gear 57. This gear 47 thereupon operates through gear 48 and gear 70 to rotate the worm 71 in the opposite direction and withdraw the rack shaft 74 and attached cutting tool 76 from the hole 87. Because the gear 47 is adjacent to the gear 70 and is of larger diameter than the gear 70, this return movement is relatively rapid as the remaining gears in the train which form the previously described gear reduction system are by-passed.

As can be seen from the above description, the device of this invention efficiently provides means for boring cylindrical holes in the customary manner. Then without the necessity of changing the device or replacing one device with another, it is possible to undercut any portion or all of the hole as desired. The device of this invention is simple in construction, yet positive in action. Furthermore, it is simple and inexpensive to construct and has no projecting parts except for the control member 64, which governs the operation of the feeding portion including the gears and worm. The device provides a positive boring action at all times as the cutting tool is both rotated and fed downward at an angle when desired to make an undercut. The rack shaft 74 is positively held for rotation with the device by the guide key extension 84a traveling in the cavity extension 73. The top of this cavity is defined by the cap 33 on top of the body 32, while the bottom is defined by the bottom portion of the body 32.

Having described my invention as related to the embodiment shown in the accompanying drawings, it is my intention that the invention be not limited by any of the details of description, unless otherwise specified, but rather be construed broadly within its spirit and scope as set out in the accompanying claims.

I claim:

1. A rotatable boring device for selectively boring cylindrical and tapered holes, comprising: a boring body rotatable about an axis of rotation; a cutting tool holder in said body having one end exposed at one end of the body and movable relative to said body along a path that is at an acute angle with respect to said axis, the tool holder having rack teeth on one side thereof; and apparatus movable relative to said body and said tool holder for thusly moving said tool holder including a gear train in said body having one gear at one end of said train operatively engaging said rack teeth and a ring gear at the other end of said train extending around said body having teeth on its inner edge with the outer edge portion exposed through an opening in said body and capable of being held against rotation during rotation of said body to drive said train and thereby move said holder in said path, the ring gear being slidable on said body for selective engagement with a first and second gear in said train, the first gear causing movement of said holder in an outward direction for boring and the second gear causing retraction of the holder.

2. The device of claim 1 wherein said second gear is closely adjacent to said rack engaging one gear in said train for relatively rapid retraction of said holder.

3. The device of claim 1 wherein a plurality of the gears of said train have their axes of rotation substantially parallel to the axis of rotation of said body.

4. A rotatable boring device for selectively boring cylindrical and tapered holes, comprising: a boring body rotatable about an axis of rotation; a cutting tool holder in said body having one end exposed at one end of the body and movable relative to said body along a path that is at an acute angle with respect to said axis; apparatus movable relative to said body and said tool holder for thusly moving said tool holder including a gear train in said body having one gear at one end of said train operatively engaging said holder and another gear at the other end of said train having a portion exposed through an opening in said body; means on said other gear for holding said other gear against rotation during rotation of said body to drive said train and thereby move said holder in said path; means for maintaining the moving apparatus stationary relative to said body and said holder during cylindrical hole boring; and means for causing relative movement between the tool holder moving apparatus, body, and holder during tapered boring, one said gear being movable relative to the other gears in said train for selective engagement with different gears in said train to move the tool holder in a desired direction relative to said body.

5. A rotatable boring device for selectively boring cylindrical and tapered holes, comprising: a boring body rotatable about an axis of rotation; a cutting tool holder in said body having one end exposed at one end of the body and movable relative to said body along a path that is at an acute angle with respect to said axis; apparatus movable relative to said body and said tool holder for thusly moving said tool holder including a gear train in said body having one gear at one end of said train operatively engaging said holder and another gear at the other end of said train having a portion exposed through an opening in said body; means on said other gear for holding said other gear against rotation during rotation of said body to drive said train and thereby move said holder in said path; means for maintaining the moving apparatus stationary relative to said body and said holder during cylindrical hole boring; and means for causing relative movement between the tool holder moving apparatus, body, and holder during tapered boring, said other gear being a ring gear extending around said body having teeth on its inner edge, with the outer edge of the ring gear being said exposed portion.

6. A rotatable boring device for selectively boring cylindrical and tapered holes, comprising: a boring body rotatable about an axis of rotation; a cutting tool holder in said body having one end exposed at one end of the body and movable relative to said body along a path that is at an acute angle with respect to said axis; apparatus movable relative to said body and said tool holder for thusly moving said tool holder including a gear train in said body having one gear at one end of said train operatively engaging said holder and another gear at the other end of said train having a portion exposed through an opening in said body; means on said other gear for holding said other gear against rotation during rotation of said body to drive said train and thereby move said holder in said path; means for maintaining the moving apparatus stationary relative to said body and said holder during cylindrical hole boring; and means for causing relative movement between the tool holder moving apparatus, body, and holder during tapered boring, said other gear being a ring gear extending around said body having teeth on its inner edge, with the outer edge of the ring gear being said exposed portion, said ring gear being slidable on said body for selective engagement with different gears in said train to move the tool holder in a desired direction relative to said body.

References Cited in the file of this patent

UNITED STATES PATENTS

| 2,093,743 | Steiner | Sept. 21, 1937 |
| 2,259,627 | Hallett | Oct. 21, 1941 |
| 2,427,855 | Grunlau | Sept. 23, 1947 |
| 2,517,738 | Tree | Aug. 8, 1950 |

FOREIGN PATENTS

| 206,764 | Germany | Oct. 16, 1907 |
| 260,919 | Switzerland | Aug. 1, 1949 |